United States Patent

Shoji

[11] Patent Number: 5,978,421
[45] Date of Patent: *Nov. 2, 1999

[54] ENVELOPE CONTROL UNIT AND DIGITAL MODULATOR USING THE ENVELOPE CONTROL UNIT AND DIGITAL MODULATION METHOD

[75] Inventor: Takashi Shoji, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/452,707

[22] Filed: May 30, 1995

[30] Foreign Application Priority Data

May 30, 1994 [JP] Japan ..................................... 6-116388

[51] Int. Cl.⁶ .................................................. H04L 25/03
[52] U.S. Cl. .......................... 375/297; 375/298; 375/308; 370/215; 332/103; 330/10
[58] Field of Search ..................................... 375/297, 295, 375/298, 302, 307, 311, 308, 271, 285, 279, 281, 284, 280; 332/103, 104, 105, 144, 145, 146; 330/10, 290, 291, 296, 75, 85; 370/215, 343; 455/110, 116, 63, 50.1; 340/825, 825.03, 825.57, 825.58, 825.7

[56] References Cited

U.S. PATENT DOCUMENTS

| | | | |
|---|---|---|---|
| 4,706,262 | 11/1987 | Ohta | 375/60 |
| 5,111,155 | 5/1992 | Keate et al. | 330/149 |
| 5,247,542 | 9/1993 | Onodera et al. | 375/60 |
| 5,412,352 | 5/1995 | Graham | 332/103 |
| 5,490,172 | 2/1996 | Komara | 375/296 |
| 5,564,087 | 10/1996 | Cygan et al. | 455/126 |

*Primary Examiner*—Chi H. Pham
*Assistant Examiner*—William Luther
*Attorney, Agent, or Firm*—Sughrue, Mion, Zinn, Macpeak & Seas, PLLC

[57] ABSTRACT

A power component of a transmission modulated wave generated by synthesizing a plurality of digital-modulated multi-carriers is calculated. Then, the envelope control unit of the present invention controls an envelope of the transmission modulated wave by outputting the transmission modulated wave as it is when the power component is smaller than a square value of a preset amplitude level, or suppressing the envelope of the transmission modulated wave at a preset suppression value in an amplitude direction.

20 Claims, 4 Drawing Sheets

ENVELOPE CONTROL UNIT AND DIGITAL MODULATOR USING THE ENVELOPE CONTROL UNIT AND DIGITAL MODULATION METHOD

BACKGROUND OF THE INVENTION

This invention relates to a modulation technology used in digital modulation communication system using a plurality of multi-carriers and, more particularly to the art of controlling an envelope of a transmission modulated wave.

A conventional power amplifier connected to a rear step of a multi-carrier digital modulator has a saturation level. With the above power amplifier, it is well-known that excessive increase in the input level may widen spectrum of the output signal due to clipping distortion.

With a communication system in which a plurality of multi-carriers are digitally modulated with transmission data for transmission, a peak power value is likely to be excessively great to an average power of transmission signals. Such system needs to operate the power amplifier at a working point at sufficiently lower than its saturation level.

This may cause the output power to be decreased simultaneously, requiring to enlarge the power amplifier for obtaining required output power.

The Japanese Patent Laid-Open No.13156(1990) has disclosed the art to solve the aforementioned problem. The disclosed radio communication unit is described referring to FIG. 4.

Figure 4:
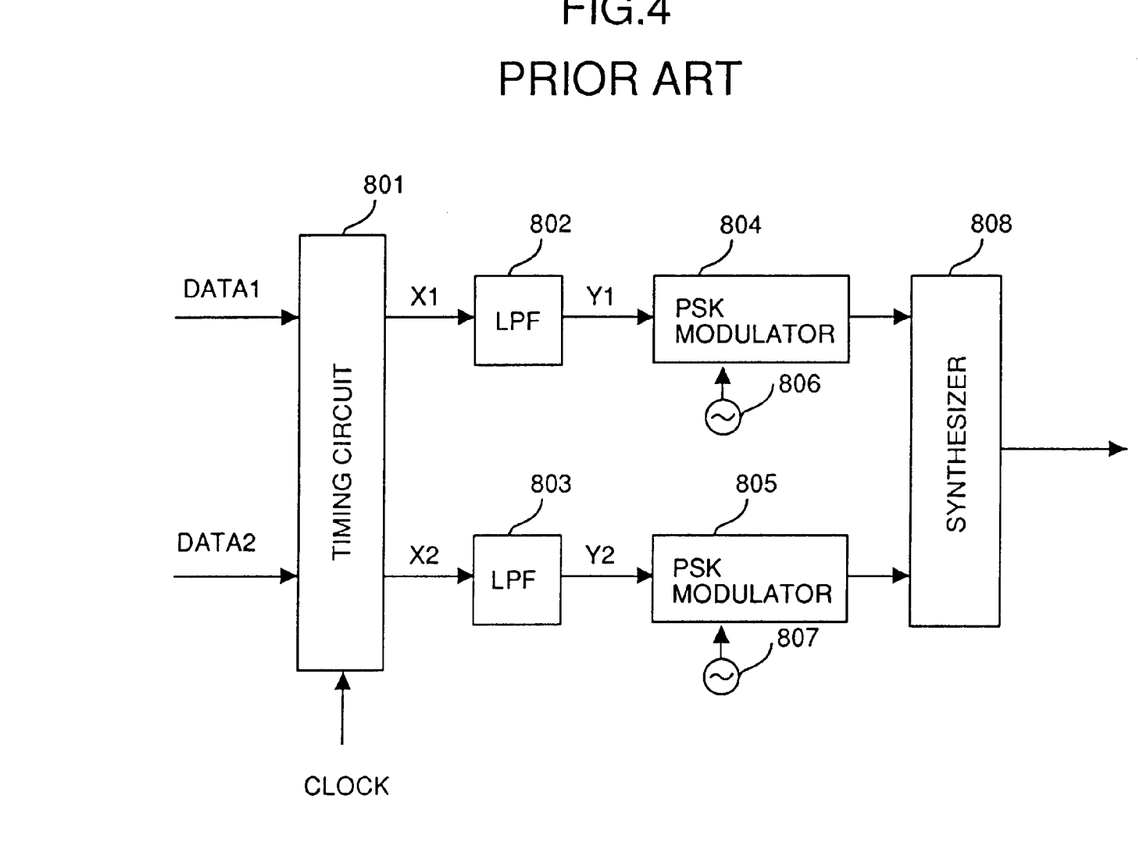
FIG. 4 is a block diagram of a prior art.

Two transmission data (DATA1 and DATA2) synchronized with a clock signal CLK are so set to locate each data variation point shifted by a half clock cycle in a timing circuit 801, which are output as X1 and X2, respectively.

The outputs X1 and X2 of the timing circuit 801 are subjected to band-limit through low pass filters 802 and 803 to become Y1 and Y2, respectively. The Y1 and Y2 output from the low pass filters 802 and 803 are input to PSK modulators 804 and 805, respectively. The PSK modulators 804 and 805 serve to produce two PSK waves through phase shift-keying modulation of carriers from carrier generators 806 and 807 with the input signals Y1 and Y2, respectively.

The two PSK waves are synthesized in a synthesizer 808. The band-limited PSK modulated waves produced by the PSK modulators 804 and 805 have the respective data variation points shifted by a half clock cycle. That is, each maximum amplitude position of the two PSK modulated waves is located so as not to interlock with each other.

As a result, the disclosed communication unit allows the maximum amplitude output from the synthesizer 808 to be smoothed to output signals at almost uniform amplitude level.

Assuming that the multi-carrier is designated as "n waves" in the above prior art, it may allow each data variation point to be shifted by 1/n of the clock cycle.

With this prior art, in order to synthesize a plurality of multi-carriers modulated through digital modulation system, for example, 2-value digital modulation system as a PSK modulation system, which causes a modulated wave to always get through the origin (amplitude:0) on IQ plane when it is between one signal point and another, each modulated wave is expected to be located so as to prevent interlocking of maximum amplitude positions. The prior art is effective for obtaining signals at almost uniform amplitude level.

While using other modulation system, for example, 8-phase PSK, π/4 shift QPSK, and 16QAM, as multi values (three values or more) digital modulation system, the modulated wave does not always get through the origin even when it is between one signal point and another.

Although each variation point of the data is shifted by 1/n of the clock cycle, the modulated wave of n wave may be located at the position where each maximum amplitude is interlocking. Accordingly the effect of "smoothing the maximum amplitude of the output to cause the signal at almost uniform amplitude level" cannot be always anticipated. This prior art, therefore, has failed to improve power efficiency of the power amplifier connected to the rear step.

SUMMARY OF THE INVENTION

It is an object of the present invention to provide a technology which allows to decrease the ratio of an average power to peak power of the transmission modulated waveform easily and stably, yet keeping information in phase direction of a multi-value digital modulated wave with 3 values or more, such as 8-phase PSK, π/4 shift QPSK, 16QAM, and the like which may not always go through the origin when the modulated wave is positioned between one signal point and another, as well as improving power efficiency of the power amplifier connected to the rear step of the digital modulator.

The object of the aforementioned present invention is realized by an envelope control unit for controlling an envelope of a transmission modulated wave generated by synthesizing digital-modulated multi-carriers, comprising: a calculator for calculating a power component of the transmission modulated wave; and envelope control means for suppressing an envelope of the transmission modulated wave in a direction of amplitude with a preset suppression value when the power component is greater than the square value of a preset amplitude level.

Moreover, the above-mentioned present invention is achieved by a digital modulator unit that digital-modulates a plurality of multi-carriers with a transmission data comprising: serial to parallel conversion means for allocating an input digital signal string to an n-wave (n is an integer of two or more) multi-carrier; n units of encoders, each of the encoders for generating a transmission signal point on a phase amplitude plane corresponding to the multi-carrier, using a transmission digital signal string allocated by the serial to digital conversion means; n units of transmission roll off filters, each of the transmission roll off filters for band-limiting outputs of a real number axis of the encoder and an imaginary number axis of the encoder; n units of multi-carrier generators, each of the multi-carrier generators for generating a multi-carrier; n unit of modulators, each of the modulators multiplying the outputs of a real number axis and an imaginary number axis of the transmission roll off filter by the multi-carrier and generating a sub-modulated wave; first adder for adding all real number axis signals of the n sub-modulated waves and outputting the result as a real number axis signal of a transmission modulated wave; second adder for adding all imaginary number axis signals of the n sub-modulated waves and outputting the result as an imaginary number axis signal of the transmission modulated wave; envelope control unit for controlling an envelope of the transmission modulated wave by amplitude-limiting the transmission modulated wave to a preset amplitude level and outputting the result as an envelope suppressed modulated wave; and interpolated wave generator for generating an interpolated wave for the envelope suppressed modulated wave and band-limiting the envelope suppressed modulated wave.

Furthermore, the above-mentioned present invention is achieved by a digital modulation method that digital-modulates a plurality of multi-carriers, generates a transmission modulated wave by synthesizing the digital-modulated multi-carriers, and amplifying the transmission modulated wave with a power amplifier, comprising step of suppressing an envelope of the transmission modulated wave of digital complex signal with a preset suppression value in an amplitude direction when a power component of the transmission modulated wave is greater than a square value of a preset amplitude level.

The present invention suppresses the envelope in amplitude direction as a digital complex signal to the complex envelope transmission modulated wave after synthesizing the sub-modulated wave so that the power amplifier connected to the rear step of the envelope controlling modulator for modulating multi-carrier digital modulation is prevented from receiving input at an excessive level.

The present invention realizes to decreases the ratio of the average power to the peak power of the transmission modulated wave easily and stably, keeping information in phase direction of the multi-value digital modulated wave which may not always go through the origin even when it is positioned between one signal point and another, thus improving power efficiency of the power amplifier to be connected to the rear step.

BRIEF DESCRIPTION OF THE DRAWINGS

Other objects and features of the present invention will be described in more detail with reference to the accompanying drawings, in which.

DESCRIPTION OF THE PREFERRED EMBODIMENTS

A first embodiment is described. In this embodiment, it is assumed that the number (n) of multi-carriers in use is 4 (n=4), and a 16QAM modulation system is used as a multi-value digital modulation system.

Figure 1:
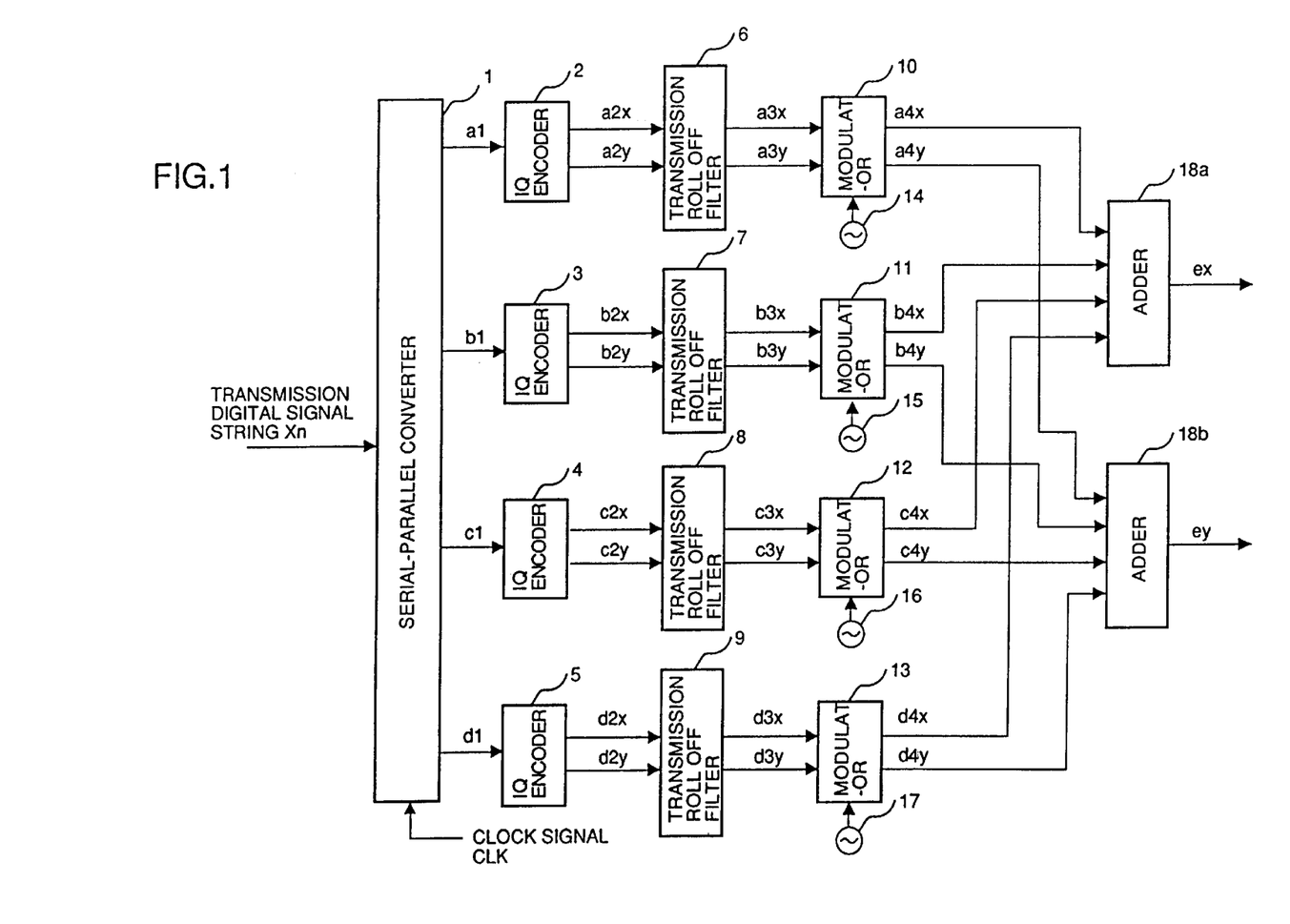
FIG. 1 is a block diagram of a first embodiment of the present invention.
Figure 2:
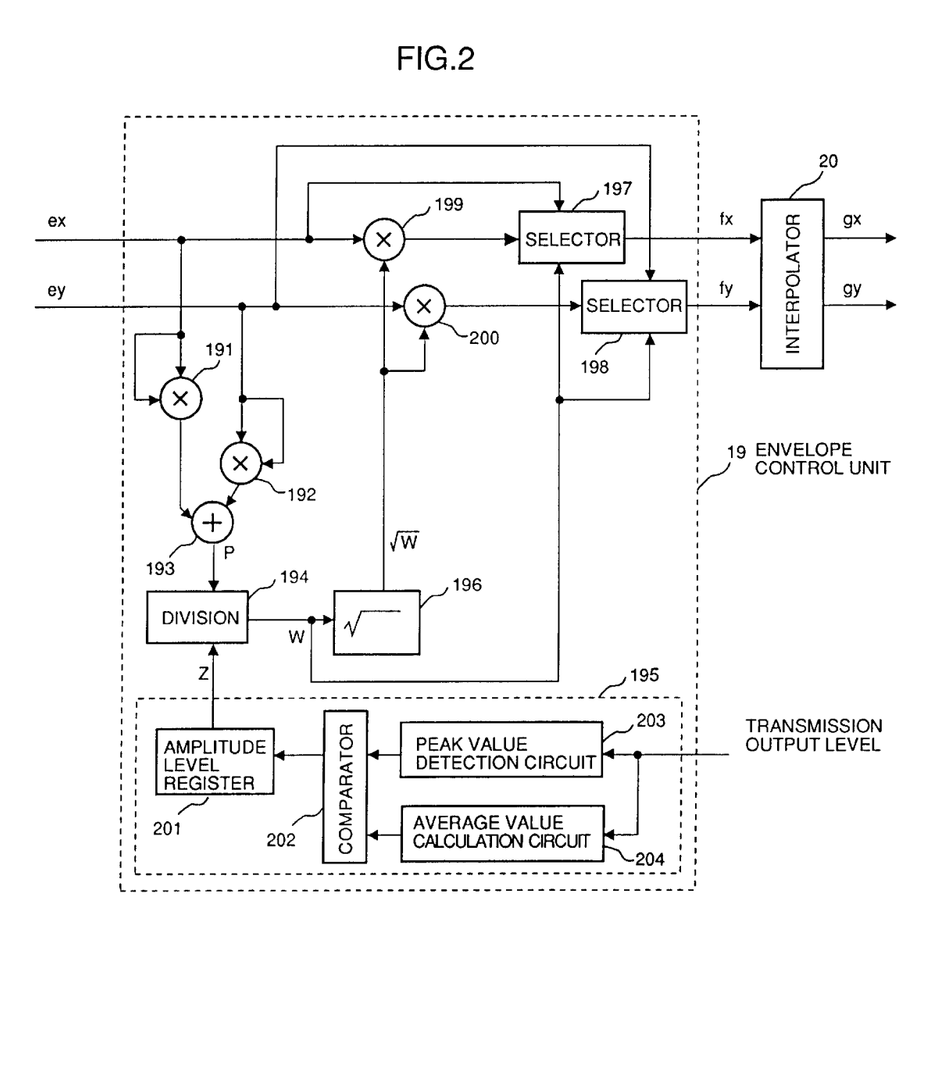
FIG. 2 is a block diagram of the first embodiment of the present invention.

FIGS. 1 and 2 are block diagrams of a multi-carrier digital modulator according to the first embodiment. In these drawings, a reference numeral 1 is a series-parallel converter, numerals 2 to 5 are IQ encoders, numerals 6 to 9 are transmission roll off filters, numerals 10 to 13 are demodulators, numerals 14 to 17 are multi-carrier oscillators, numerals 18a and 18b are adders, numerals 19 is an envelope control unit, and 20 is an interpolator.

Operation of the multi-carrier digital modulator is described.

When modulating input transmission digital signal string Xn through 16QAM modulation method, 4 bits per signal point can be transmitted.

The series-parallel converter 1 converts the transmission digital signal string Xn into signal sequences a1 to d1 synchronized with a clock signal CLK at every 4 bits for splitting into 4 multi-carriers. The signal string a1 is input to an IQ encoder 2. The signal string b1 is input to the IQ encoder 3, the c1 to the IQ encoder 4, and the d1 to the IQ encoder 5, respectively.

These IQ encoders 2 to 5 produce transmission signal points, in which each 4 bits of the signal sequences a1 to d1 input onto the IQ plane corresponding to 4 multi-carriers, respectively, are designated as one signal point. Assuming that real number axis component of the transmission signal point is designated as real number axis signals a2x to d2x, and imaginary number components as imaginary number axis signals a2y to d2y, the IQ encoders 2 to 5 output transmission complex signals (a2x, a2y), (b2x, b2y), (c2x, c2y), and (d2x, d2y) at signal point speed of a fourth of the clock signal CLK, respectively.

The transmission complex signals output from the IQ encoders 2 to 5, (a2x, a2y), (b2x, b2y), (c2x, c2y) and (d2x, d2y) are signals containing infinite frequency components if they are kept unchanged. The frequency band of the transmission complex signal (a2x, a2y) is limited through a transmission roll off filter 6. The frequency band of the transmission complex signals (b2x, b2y), (c2x, c2y), and (d2x, d2y) are likewise limited through transmission roll off filters 7, 8 and 9, respectively.

Using complex value z for Z conversion and straight line phase FIR digital filter coefficient shown in the following equation for the band limit;

$$H(z) = \sum_{S=0}^{N-1} h(s) Z^{-s} \quad (1)$$

(where N denotes an order of the filter.)
each frequency band is limited through filtering process with no interlocking among codes to be further converted into transmission low area complex signals (a3x, a3y), (b3x, b3y), (c3x, c3y) and (d3x, d3y), respectively according to the following convolution equation;

$$m3x(p) = \sum_{S=0}^{N-1} \{h(s) \times m2x(p-s)\} \quad (2)$$

$$m3y(p) = \sum_{S=0}^{N-1} \{h(s) \times m2y(p-s)\}$$

(where N is an order of the filter, p is a time sequence of the transmission complex signal, and m is a suffix corresponding to each sub-carrier wave a,b,c and d.)

The transmission low area complex signals (a3x, a3y), (b3x, b3y), (c3x, c3y) and (d3x, d3y) are respectively multiplied by sub-carriers exp (jωmt) produced by sub modulated wave oscillators 14 to 17 according to the following equations through modulators 10, 11, 12 and 13, which have been converted into sub-modulated wave complex signals (a4x, a4y), (b4x, b4y), (c4x, c4y), and (d4x, d4y), respectively.

$$m4x = m3x \times \cos(\omega mt) - m3y \times \sin(\omega mt)$$

$$m4y = m3x \times \sin(\omega mt) + m3y \times \cos(\omega mt)$$

(where m is a suffix corresponding to each sub-carrier a, b, c, and d.)

Adders 18a and 18b generate transmission modulated wave complex signals (ex, ey) by adding whole real number axis signals and whole imaginary number axis signals of sub modulated wave complex signals, respectively according to the following equations;

$$ex = a4x + b4x + c4x + d4x$$
$$ey = a4y + b4y + c4y + d4y.$$

The envelope control unit 19 is described in detail.

In FIG. 2, reference numerals 191 and 192 are multipliers, 193 is an adder, 194 is a divider, 195 is an amplitude setting device, 196 is a square root calculator, 197 and 198 are selectors, and 199 and 200 are multipliers.

The amplitude setting device 195 has been preset to a desired amplitude level Z.

The multiplier 191 squares a real number axis signal ex of transmission modulated wave complex signals from the adder 18a to obtain a real number axis power component $ex^2$. The multiplier 192 squares an imaginary number axis signal ey of transmission modulated wave complex signals from the adder 18b to obtain an imaginary number axis power component $ey^2$.

The adder 193 adds the real number axis power component $ex^2$ and the imaginary number axis power component $ey^2$, and outputs the calculation result as a transmission modulated wave power component P.

The divider 194 divides the squared value $Z^2$ at the desired amplitude level Z which has been preset in the amplitude setting device 195 by the transmission modulated wave power component P to output power suppression ratio W ($W = Z^2/P$).

The amplitude setting device 195 serves to monitor an output level of a power amplifier connected to the rear step of the envelope control modulator of the present invention. If the output level is sufficiently lower than the saturation level of the power amplifier, it functions in increasing the preset amplitude level Z. If the output level is relatively high relative to the saturation level, it functions in decreasing the preset amplitude level Z. As a result, it is so set to prevent the envelope from receiving either excessive or insufficient suppression.

The above operation is performed as below.

First, a peak value detection circuit 203 detects a peak value level of an output of the power amplifier connected in rear step of the envelope control modulator of the present invention.

An average value calculation circuit 204 calculates an average level of the output of the power amplifier, and multiplies the average value level by a preset constant number (that is decided according to performance of the power amplifier connected in rear step)

A comparator 202 compares an output of the peak value detection circuit 203 and an output of the average value calculation circuit 204. And the comparator 202 increase the preset amplitude level Z of an amplitude level register 201 when the peak value level is sufficiently smaller than the saturation level of the power amplifier, and decrease the the preset amplitude level Z when the peak value level is larger than the saturation level of the power amplifier to keep a ratio of the output of the peak value detection circuit 203 and the output of the average value calculation circuit 204 constant.

The power suppression ratio W is output to the selectors 197 and 198, and the square root calculator 196.

In case of the power suppression ratio $W \geq 1$, the selectors 197 and 198 select the real number axis signal ex from the adder 18a and the imaginary number axis signal ey from the adder 18b. The selectors 197 and 198 output the real number axis signal ex and the imaginary number axis signal ey as the real number axis signal fx and the imaginary number axis signal fy of the envelope control unit 19, respectively.

While in case of W<1, outputs of the multipliers 199 and 200 are selected to be output as the real number axis output fx and the imaginary number axis output fy of the envelope control unit 19, respectively.

The square root calculator 196 calculates square root of the power suppression ratio W and outputs the calculation result as the amplitude suppression ratio $\sqrt{w}$.

The multiplier 199 multiplies the amplitude suppression ratio $\sqrt{w}$ by a real number axis signal ex of the transmission modulated wave. The multiplier 200 multiplies the amplitude suppression ratio $\sqrt{w}$ by an imaginary number axis signal ey of the transmission modulated wave.

The multipliers 199 and 200 are so designed to generate the envelope suppression modulated wave complex signals (fx, fy), at a level lower than the desired amplitude level Z which has been preset. Each signal is output by suppressing the envelope of the transmission modulated wave as follows;

$$fx = ex \times w$$
$$fy = ey \times w.$$

Using a straight phase FIR digital filter coefficient obtained from the following equation expressed by a complex value z of Z conversion;

$$I(Z) = \sum_{S=0}^{N-1} i(s)Z^{-s} \qquad (3)$$

the interpolator 20 generates interpolation waveform of the envelope suppression modulation wave complex signals (fx, fy) from the envelope control unit 19, and band-limits the complex signals (fx, fy) according to the following convolution equation;

$$gx(q) = \sum_{S=0}^{N-1} \{i(s) \times fx(q-s)\} \qquad (4)$$

$$gy(q) = \sum_{S=0}^{N-1} \{i(s) \times fx(q-s)\}$$

(where N is an order of the filter, and q is a time sequence). The interpolator 20 outputs the result as the multi-carrier digital modulated signal (gx, gy).

This embodiment assumes that the number (n) of the carrier in use is 4 (n=4) and 16QAM modulation method is used as the multi-value digital modulation method to construct the series-parallel converter 1 and IQ signal converters 2 to 4. Changes in bit number to be divided, bit number per one signal point, and signal point speed according to the number of designated sub-carrier and multi-value digital modulation method may provide the same operation as that of this embodiment.

This is the end of the explanation of the first embodiment.

Next, the second embodiment is described.

Figure 3:
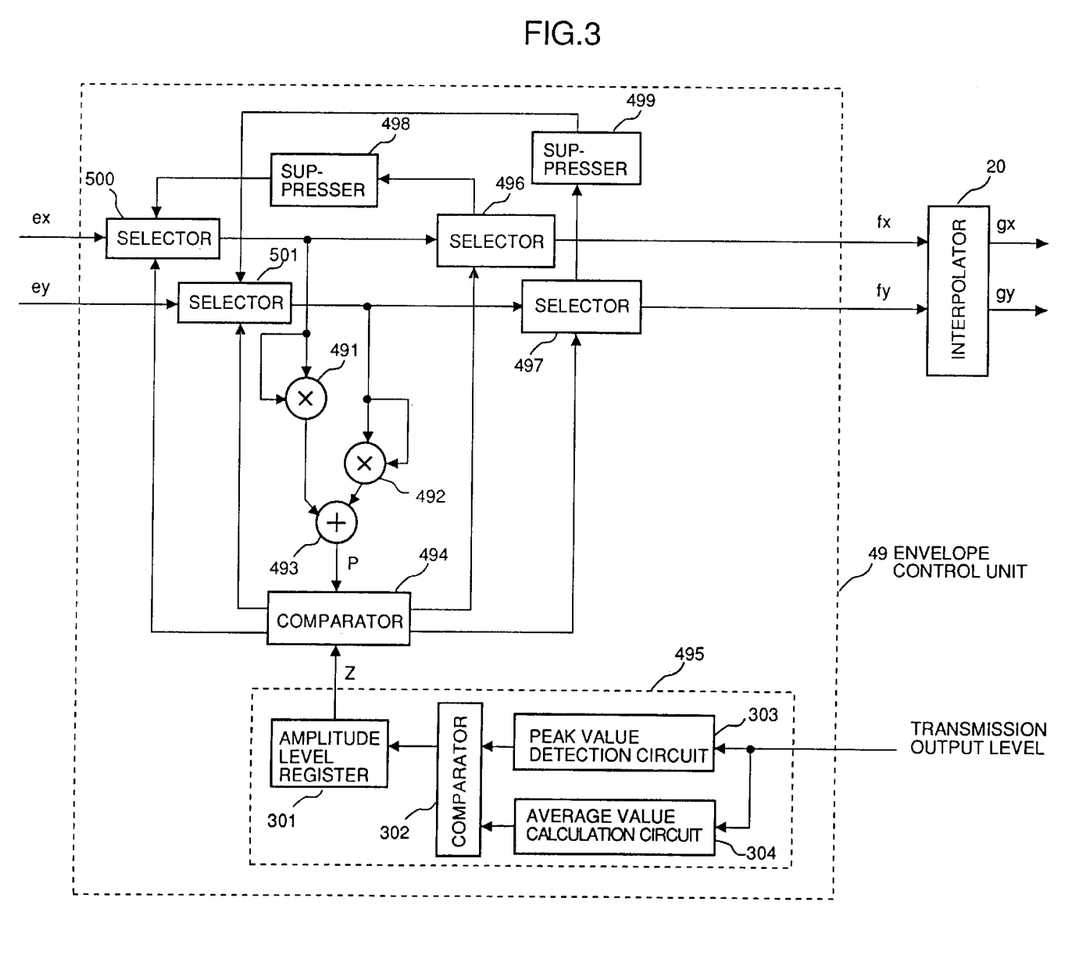
FIG. 3 is a block diagram of a second embodiment of the present invention.

In the second embodiment, an envelope control unit 49 is provided instead of the envelope control unit 19 in the first embodiment. So, differences between them are explained.

FIG. 3 is a block diagram of the envelope control unit 49.

In FIG. 3, an amplitude setting device 495 in the envelope control unit 49 is set in advance with a desired amplitude level Z. A multiplier 491 squares a real number axis signal ex of a transmission modulated wave complex signal that is output from an adder 18a to calculate a real number axis power component $ex^2$. Also, a multiplier 492 squares an imaginary number axis signal ey that is output from an adder 18b to calculate an imaginary number axis power component $ey^2$. An adder 493 adds the real number axis power component $ex^2$ and the imaginary number axis power component $ey^2$, and outputs the result as a transmission modulated wave power component P.

A comparator 494 compares sizes of a square value $Z^2$ of desired amplitude level that is set in advance in the amplitude setting device 495 and the transmission modulated wave power component P and outputs:

0 when $Z^2 \geq P$; or
1 when $Z^2 < P$.

At this time, the amplitude setting device 495 monitors an output level of a power amplifier connected in rear step of the envelope control modulator of the present invention, to increase the preset amplitude level Z when the output level of the power amplifier is sufficiently smaller than a saturation level of the power amplifier, or to decrease the preset amplitude level Z when it is larger than that. Thus, the amplitude setting device 495 functions not to excessively suppress the envelope or not to insufficiently suppress the envelop.

The above operation is performed as below.

First, a peak value detection circuit 303 detects a peak value level of an output of the power amplifier connected in rear step of the envelope control modulator of the present invention.

An average value calculation circuit 304 calculates an average level of the output of the power amplifier, and multiplies the average value level by a preset constant number (that is decided according to performance of the power amplifier connected in rear step)

A comparator 302 compares an output of the peak value detection circuit 303 and an output of the average value calculation circuit 304. And the comparator 302 increases the preset amplitude level Z of an amplitude level register 301 when the peak value level is sufficiently smaller than the saturation level of the power amplifier, and decreases the the preset amplitude level Z when the peak value level is larger than the saturation level of the power amplifier to keep a ratio of the output of the peak value detection circuit 303 and the output of the average value calculation circuit 304 constant.

Selectors 496 and 497 selects and outputs a real number axis input signal ex and an imaginary number axis input signal ey as a real number axis signal fx and an imaginary number axis signal fy when the output of the comparator 494 is "0". When this output is "1", it selects and outputs the real number axis signal ex and the imaginary number axis signal ey to suppressors 498 and 499, respectively.

The suppressor 498 multiplies the input signal by a preset suppression ratio and outputs the result to a selector 500.

The suppressor 499 multiplies the input signal by a preset suppression ratio and outputs the result to a selector 501.

Here, it is assumed that ratios preset in the suppressors 498 and 499 are the same value.

The real number axis signal ex and the output of the suppressor 498 are input to the selector 500.

The imaginary number axis signal ey and the output of the suppressor 499 are input to the selector 501.

The selectors 500 and 501 outputs the real number axis signal ex and the imaginary number axis signal ey to the selectors 496 and 497 respectively, when an output of the comparator 494 is "0".

On the other hand, the selectors 500 and 501 outputs the outputs of the suppressors 498 and 499 to the selectors 496 and 497, when an output of the comparator 494 is "1".

Like this, the envelope control unit 49 repeats the operation until $z^2$ becomes equal to or larger than P in the comparator 494, and outputs an envelope suppression modulated wave complex signal (fx, fy) that is smaller than the preset desired amplitude level z.

What is claimed is:

1. An envelope control unit for controlling an envelope of a transmission modulated wave generated by synthesizing digital-modulated multi-carriers, comprising:

a calculator for calculating a power component of said transmission modulated wave; and envelope control means for suppressing an envelope of said transmission modulated wave in a direction of amplitude by multiplying said transmission modulated wave by a suppression value when said power component of said transmission modulated wave is greater than a square value of a preset amplitude level, said suppression value being equal to a square root of a power suppression ratio which is equal to said square value of said preset amplitude level divided by said power component of said transmission modulated wave.

2. The envelope control unit of claim 1, wherein said means for calculating further comprises:

first multiplying means for squaring a real number axis component of said transmission modulated wave and outputting the result as a real number axis power component;

second multiplying means for squaring an imaginary number axis component of said transmission modulated wave and outputting the result as an imaginary number axis power component; and means for adding said real number axis power component and said imaginary number axis power component and outputting the result as said power component of transmission modulated wave.

3. An envelope control unit for controlling an envelope of a transmission modulated wave generated by synthesizing digital-modulated multi-carriers, said transmission modulated wave including a real number axis component and an imaginary number axis component, said envelope control unit comprising:

a calculator for calculating a power component of said transmission modulated wave; and envelope control means for suppressing an envelope of said transmission modulated wave in a direction of amplitude when said power component of said transmission modulated wave is greater than a square value of a preset amplitude level, wherein said envelope control means further comprises:

first amplitude level setting means for setting said preset amplitude level;

means for calculating a power suppression ratio, said power suppression ratio being equal to said square value of said preset amplitude level divided by said power component of said transmission modulated wave;

means for calculating a square root of said power suppression ratio, and outputting the calculation result as a suppression value;

first multiplying means for multiplying said real number axis component of said transmission modulated wave by said suppression value;

second multiplying means for multiplying said imaginary number axis component of said transmission modulated wave by said suppression value;

a first selector for inputting said real number axis component of said transmission modulated wave and an output of said first multiplying means, and outputting said real number axis component of said transmission modulated wave when said power suppression ratio $\geq 1$, and outputting said output of said first multiplying means when said power suppression ratio <1; and a second selector for inputting said imaginary number axis component of said transmission modulated wave and an output of said second multiplying means, and outputting said imaginary number axis component of said transmission modulated wave when said power suppression ratio $\geq 1$, and selecting and outputting said output of said second multiplying means when said power suppression ratio <1.

4. The envelope control unit of claim 3, wherein said first amplitude level setting means comprises means for changing said preset amplitude level, based on transmission output power of said transmission modulated wave.

5. An envelope control unit for controlling an envelope of a transmission modulated wave generated by synthesizing digital-modulated multi-carriers, said transmission modulated wave including a real number axis component and an imaginary number axis component, said envelope control unit comprising:

a calculator for calculating a power component of said transmission modulated wave; and envelope control means for suppressing an envelope of said transmission modulated wave in a direction of amplitude when said power component of said transmission modulated wave is greater than a square value of a preset amplitude level, wherein said envelope control means further comprises:

comparison means for comparing said square value of said preset amplitude level and said power component of said transmission modulated wave and outputting a comparison signal indicating size relation;

first suppression means for suppressing a real number axis component of said transmission modulated wave at a first preset suppression ratio;

second suppression means for suppressing an imaginary number axis component of said transmission modulated wave at a second preset suppression ratio;

a first selector for outputting said real number axis component of said transmission modulated wave to said first suppression means when said comparison signal indicates that said power component of said transmission modulated signal is larger than a square value of said preset amplitude level, and outputting said real number axis component of said transmission modulated wave as an output of said envelope control unit when said comparison signal indicates that said power component of said transmission modulated signal is smaller than said square value of said preset amplitude level;

a second selector for outputting said imaginary number axis component of said transmission modulated wave to said second suppression means when said comparison signal indicates that said power component of said transmission modulated signal is larger than said square value of said preset amplitude level, and outputting said imaginary number axis component of said transmission modulated wave as an output of said envelope control unit when said comparison signal indicates that said power component of said transmission modulated signal is smaller than said square value of said preset amplitude level;

a third selector for inputting said real number axis component of said transmission modulated wave and an output signal of said first suppression means, and outputting said output signal of said first suppression means to said first selector when said comparison signal indicates that said power component of said transmission modulated signal is larger than said square value of said preset amplitude level, and outputting said real number axis component of said transmission modulated wave to said first selector when said comparison signal indicates that said power component of said transmission modulated signal is smaller than said square value of said preset amplitude level;

a fourth selector for inputting an imaginary number axis component of said transmission modulated wave and an output signal of said second suppression means, and outputting said output signal of said second suppression means to said second selector when said comparison signal indicates that said power component of said transmission modulated signal is larger than said square value of said preset amplitude level, and outputting said imaginary number axis component of said transmission modulated wave to said second selector when said comparison signal indicates that said power component of said transmission modulated signal is smaller than said square value of said preset amplitude level.

6. The envelope control unit of claim 5, wherein said amplitude level setting means comprises means for changing said preset amplitude level, based on transmission output power of said transmission modulated wave.

7. The envelope control unit of claim 5, wherein said first preset suppression ratio and said second preset suppression ratio are equal.

8. A digital modulator which digital-modulates a plurality of multi-carriers with transmission data comprising:

serial to parallel conversion means for allocating an input digital signal string to an n-wave multi-carrier, where n is an integer of two or more;

n encoders, each of said encoders generating a respective transmission signal point on a phase amplitude plane corresponding to said n-wave multi-carrier, using a transmission digital signal string allocated by said serial to parallel conversion means;

n transmission roll off filters, each of said transmission roll off filters band-limiting a respective real number axis component of a respective one of said n encoders and a respective imaginary number axis component of said respective one of said n encoders;

n multi-carrier generators, each of said multi-carrier generators generating a multi-carrier;

n modulators, each of said modulators multiplying a respective band-limited real number axis component of a respective one of said n transmission roll off filters and a respective band-limited imaginary number axis component of said respective one of said transmission roll off filters by a respective multi-carrier to generate a real axis component and an imaginary axis component of a respective submodulated wave;

first adder for adding all real number components of n sub-modulated waves and outputting the result as a transmission modulated real number signal;

second adder for adding all imaginary number components of said n sub-modulated waves and outputting the result as a transmission modulated imaginary number signal;

envelope control unit for controlling an envelope of a transmission modulated wave which contains said transmission modulated real number signal and said transmission modulated imaginary number signal by amplitude-limiting said transmission modulated wave to a preset amplitude level and outputting the result as an envelope suppressed modulated wave; and an interpolated wave generator for generating an interpolated wave for said envelope suppressed modulated wave and band-limiting said envelope suppressed modulated wave.

9. The digital modulator of claim 8, wherein said envelope control unit comprises:

a calculator for calculating a power component of said transmission modulated wave; and envelope control means for suppressing said envelope of said transmission modulated wave in a direction of amplitude when said power component is greater than said square value of said preset amplitude level.

10. The digital modulator of claim 9, wherein said calculator comprises:

first multiplying means for squaring said transmission modulated real number signal and outputting the result as a real number axis power component;

second multiplying means for squaring said transmission modulated imaginary number signal and outputting the result an imaginary number axis power component; and means for adding said real number axis power component and said imaginary number axis power component and outputting the result said power component of said transmission modulated wave.

11. A digital modulator which digital-modulates a plurality of multi-carriers with transmission data, comprising:

serial to parallel conversion means for allocating an input digital signal string to an n-wave multi-carrier, where n is an integer of two or more;

n encoders, each of said encoders generating a respective transmission signal point on a phase amplitude plane corresponding to said n-wave multi-carrier, using a transmission digital signal string allocated by said serial to parallel conversion means;

n transmission roll off filters, each of said transmission roll off filters band-limiting a respective real number axis component of a respective one of said n encoders and a respective imaginary number axis component of said respective one of said n encoders;

n multi-carrier generators, each of said multi-carrier generators generating a multi-carrier;

n modulators, each of said modulators multiplying a respective band-limited real number axis component of a respective one of said n transmission roll off filters and a respective band-limited imaginary number axis component of said respective one of said transmission roll off filters by a respective multi-carrier to generate a real axis component and an imaginary axis component of a respective submodulated wave;

first adder for adding all real number components of n sub-modulated waves and outputting the result as a transmission modulated real number signal;

second adder for adding all imaginary number components of said n sub-modulated waves and outputting the result as a transmission modulated imaginary number signal;

envelope control unit for controlling an envelope of a transmission modulated wave which contains said transmission modulated real number signal and said transmission modulated imaginary number signal by amplitude-limiting said transmission modulated wave to a preset amplitude level and outputting the result as an envelope suppressed modulated wave; and an interpolated wave generator for generating an interpolated wave for said envelope suppressed modulated wave and band-limiting said envelope suppressed modulated wave, wherein said envelope control unit comprises:

a calculator for calculating a power component of said transmission modulated wave; and envelope control means for suppressing said envelope of said transmission modulated wave in a direction of amplitude when said power component is greater than said square value of said preset amplitude level, wherein the said envelope control means comprises:

amplitude level setting means in which said preset amplitude level is set;

means for calculating a power suppression ratio, said power suppression ratio being equal to said square value of said preset amplitude level divided by said power component of said transmission modulated wave;

means for calculating a square root of said power suppression ratio, and outputting the calculation result as a suppression value;

first multiplying means for multiplying said transmission modulated real number signal by said suppression value;

second multiplying means for multiplying said transmission modulated imaginary number signal by said suppression value;

a first selector for inputting said transmission modulated real number signal and an output of said first multiplying means, and outputting said transmission modulated real number signal when said power suppression ratio $\geq 1$, and selecting and outputting said output of said first multiplying means when said power suppression ratio $<1$; and a second selector for inputting said transmission modulated imaginary number signal and an output of said second multiplying means, and outputting said transmission modulated imaginary number signal when said power suppression ratio $\geq 1$, and outputting said output of said second multiplying means when said power suppression ratio $<1$.

12. The digital modulation unit of claim 11, wherein said first amplitude level setting means comprises means for changing said preset amplitude level, based on transmission output power of a power amplifier connected to rear step of said digital modulation unit.

13. A digital modulator which digital-modulates a plurality of multi-carriers with transmission data, comprising:

serial to parallel conversion means for allocating an input digital signal string to an n-wave multi-carrier, where n is an integer of two or more;

n encoders, each of said encoders generating a respective transmission signal point on a phase amplitude plane corresponding to said n-wave multi-carrier, using a transmission digital signal string allocated by said serial to parallel conversion means;

n transmission roll off filters, each of said transmission roll off filters band-limiting a respective real number axis component of a respective one of said n encoders and a respective imaginary number axis component of said respective one of said n encoders;

n multi-carrier generators, each of said multi-carrier generators generating a multi-carrier;

n modulators, each of said modulators multiplying a respective band-limited real number axis signal of a respective one of said n transmission roll off filters and a respective band-limited imaginary number axis signal of said respective one of said transmission roll off filters by a respective multi-carrier to generate a real axis component and an imaginary axis component of a respective submodulated wave;

first adder for adding all real number components of n sub-modulated waves and outputting the result as a transmission modulated real number signal;

second adder for adding all imaginary number components of said n sub-modulated waves and outputting the result as a transmission modulated imaginary number signal;

envelope control unit for controlling an envelope of a transmission modulated wave which contains said transmission modulated real number signal and said transmission in modulated imaginary number signal by amplitude-limiting said transmission modulated wave to a preset amplitude level and outputting the result as an envelope suppressed modulated wave; and an interpolated wave generator for generating an interpolated wave for said envelope suppressed modulated wave and band-limiting said envelope suppressed modulated wave, wherein said envelope control unit comprises:
  a calculator for calculating a power component of said transmission modulated wave; and
  envelope control means for suppressing said envelope of said transmission modulated wave in a direction of amplitude when said power component is greater than said square value of said preset amplitude level, wherein said envelope control means further comprises:
    comparison means for comparing said square value of said preset amplitude level and said power component of said transmission modulated wave and outputting a comparison signal indicating size relation;
    first suppression means for suppressing said transmission modulated real number signal at a first preset suppression ratio;
    second suppression means for suppressing said transmission modulated imaginary number signal at a second preset suppression ratio;
    a first selector for outputting said transmission modulated real number signal to said first suppression means when said comparison signal indicates that said power component of said transmission modulated signal is larger than said square value of said preset amplitude level, and outputting said transmission modulated real number signal as an output of said envelope control unit when said comparison signal indicates that said power component of said transmission modulated signal is smaller than said square value of said preset amplitude level;
    a second selector for outputting said transmission modulated imaginary number signal to said second suppression means when said comparison signal indicates that said power component of said transmission modulated signal is larger than said square value of said preset amplitude level, and outputting said transmission modulated imaginary number signal as an output of said envelope control unit when said comparison signal indicates that said power component of said transmission modulated signal is smaller than said square value of said preset amplitude level;
    a third selector for inputting transmission modulated real number signal and an output signal of said first suppression means, and outputting said output signal of said first suppression means to said first selector when said comparison signal indicates that said power component of said transmission modulated signal is larger than said square value of said preset amplitude level, and outputting said transmission modulated real number signal to said first selector when said comparison signal indicates that said power component of said transmission modulated signal is smaller than said square value of said preset amplitude level;
    a fourth selector for inputting said transmission modulated imaginary number signal and an output signal of said second suppression means, and outputting said output signal of said second suppression means to said second selector when said comparison signal indicates that said power component of said transmission modulated signal is larger than said square value of said preset amplitude level, and outputting said transmission modulated imaginary number signal to said second selector when said comparison signal indicates that said power component of said transmission modulated signal is smaller than said square value of said preset amplitude level.

14. The digital modulator of claim 13, wherein said amplitude level setting means comprises means for changing said preset amplitude level, based on transmission output power of a power amplifier connected to rear step of said digital modulation unit.

15. The digital modulator of claim 13, wherein said first preset suppression ratio and said second preset suppression ratio are equal.

16. A digital modulation method that digital-modulates a plurality of multi-carriers, generates a transmission modulated wave having a real number axis component and an imaginary number axis component by synthesizing a plurality of digital-modulated multi-carriers, and amplifies said transmission modulated wave with a power amplifier, said method comprising the step of suppressing an envelope of said transmission modulated wave in an amplitude direction by multiplying said transmission modulated wave by a suppression value when a power component of said transmission modulated wave is greater than a square value of a preset amplitude level, said suppression value being equal to a square root of a power suppression ratio which is equal to said square value of said preset amplitude level divided by said power component of said transmission modulated wave.

17. A digital modulation method of claim 16, wherein said suppressing step comprises:
  step of calculating said power suppression ratio;
  step of calculating a suppression value by calculating a square root of said power suppression ratio; and
  step of multiplying a real number axis signal of said transmission modulated wave by said suppression value and multiplying an imaginary number axis signal of said transmission modulated wave by said suppression value and suppressing said envelope of said transmission modulated wave, when said power component of said transmission modulated wave is greater than said square value of said preset amplitude level.

18. The digital modulation method of claim 16, wherein said suppressing step comprises:

the step of comparing a size relation of said power component of said transmission modulated wave and said square value of said preset amplitude level; and the step of suppressing an envelope of said transmission modulated wave by suppressing said real number axis component of said transmission modulated wave and said imaginary number axis component of said transmission modulated wave until said power component of said transmission modulated wave becomes smaller than said square value of said preset amplitude level at a preset power suppression ratio, said power suppression ratio being equal to said square value of said preset amplitude level divided by said power component of said transmission modulated wave.

19. The digital modulation method of claim 18, wherein said suppressing step suppresses said real number axis signal of said transmission modulated wave and said imaginary axis signal of said transmission modulated wave at an equal suppression ratio.

20. The digital modulation method of claim 16, wherein said preset amplitude level is changed corresponding to an output level of said power amplifier.

* * * * *